June 13, 1933.  M. J. GRASS  1,913,381
FAUCET
Filed Nov. 13, 1931

INVENTOR
Michael J Grass
BY Popps and Powers
ATTORNEY

Patented June 13, 1933

1,913,381

UNITED STATES PATENT OFFICE

MICHAEL J. GRASS, OF BUFFALO, NEW YORK, ASSIGNOR TO THE DAVID BELL COMPANY INC., OF BUFFALO, NEW YORK, A CORPORATION OF NEW YORK

FAUCET

Application filed November 13, 1931. Serial No. 574,750.

This invention relates to a faucet and more particularly to a faucet for domestic use such as the faucet shown and described in the patent of Winslow P. Bradford, Number 1,760,810, dated May 27, 1930, although the invention can also be embodied in other types of faucets.

The principal object of the present invention is to provide a valve head or washer retaining means which permits the washer to be pressed into position, after which it is reliably held in proper position to set upon the valve seat and stop the flow of fluid through the valve but can be readily removed should the washer require replacement.

Another object is to provide such a retaining means for the washer in the faucet which permits of the use of ordinary round washers and does not require any special forming of the same.

Another object is to so form the valve head that upon pressing the washer inwardly into the valve head the washer is compressed or contracted and upon being pressed further into the valve head expands to engage a shoulder which permits its withdrawal.

Another object is to provide such a valve head which can be produced at extremely low cost so that the use of the invention does not involve any increased cost in any faucet in which it is employed.

Figure 1:
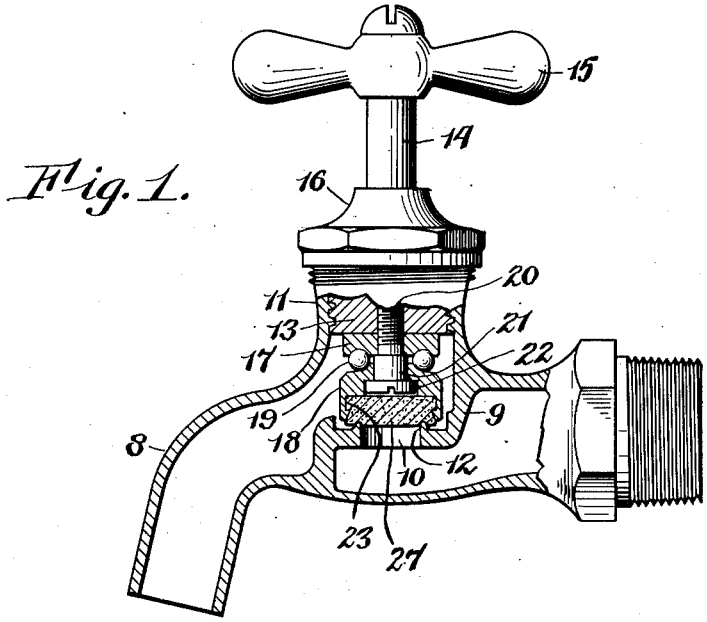
Figure 1 is a vertical, longitudinal section, partly in elevation, of a faucet embodying my invention.
Figure 2:
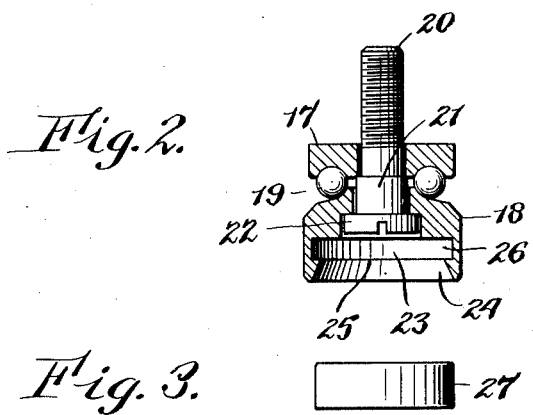
Figure 2 is a vertical, longitudinal section of the valve head shown in section in Fig. 1 and showing the washer removed therefrom.
Figure 3:
Figure 3 is a side elevation of the washer showing its condition before it is pressed into the valve head.

In the faucet shown, the valve body 8 is of the usual form being threaded at one end which screws into the water supply pipe and also having an internally formed diaphragm 9 and port 10 above which the body is formed to provide an externally threaded boss 11. Surrounding the port 10 is a raised valve seat 12 on which the packing washer is forced to cut off the flow of water through the port 10.

The operating mechanism to secure the vertical movement of the valve head to cut off or permit the flow of water through the port 10 can be of any suitable construction and is shown as comprising a nut 13 which is externally threaded and engages the internal threads of the boss 11 so that upon being turned this nut is raised and lowered. To this nut is secured the usual stem 14 which is turned by means of a handle 15. Leakage of water is prevented by a cap 16 which is screwed onto the boss 11 and has an opening which receives and permits turning of the valve stem 14. The usual packing (not shown) is provided between this cap 16 and the stem 14 and boss 11.

Secured to the lower face of the nut 13 is an upper race member 17 and the valve head 18, this valve head 18 being also formed to provide a lower race member, and ball bearings 19 are provided between the upper and lower race members 17 and 18. These members are secured to the nut 13 and in proper spaced relation to one another by means of a screw 20 which has a threaded end of small diameter which screws into the nut 13 and an enlarged shoulder 21 which bears against the under side of the upper race member 17 and holds it firmly against the lower face of the nut 13 and a head 22 which bears against the under side of the head 18 and holds this head or lower race member 18 in proper spaced relation to the upper race member 17. This valve head or lower race member 18 is of inverted cup shape form having a downwardly opening recess 23. The inner face of the rim 24 of this recess 23 is of conical or beveled form and terminates in a pointed shoulder 25, the portion 26 of the recess immediately above the shoulder 25 being of approximately the same diameter as the maximum diameter of the mouth of the recess 23. It is therefore apparent that the shoulder 25 forms a tooth which will permit the insertion of a soft washer into the same and will retain it in the recess 23. This washer 27 is of ordinary round or cylindrical form.

With a valve head and washer constructed as described, and the washer being of approximately the same diameter as the maximum diameter of the recess 23 it is apparent that upon pressing the washer into the recess 23 the upper rim of the washer will engage the bevel face of the rim 24 and will be compressed inwardly thereby. As the washer is forced in still further the upper end of the washer passes over the sharp corner of the shoulder 25 and expands into the enlarged portion 26 of the recess so that when the washer is pressed home, as shown in Fig. 1, the upper part of the washer is expanded to fill the entire upper portion of the recess, its intermediate portion is compressed by the shoulder 25 and its lower end projects below the rim of the valve head. Since the valve head is formed to provide the sharp shoulder 25 it is apparent that the washer 27 will not become accidentally displaced. At the same time, being soft, the washer can be readily removed by inserting a knife or other sharp instrument and prying it loose.

From the foregoing it is apparent that the present invention provides a faucet head for retaining a washer in which the washer is assembled and reliably held in position by merely pressing it into position and that at the same time it can be readily removed when a replacement is required. It is therefore apparent that the present invention facilitates both assembling and replacing washers in faucets and at the same time provides a construction which is substantially less expensive than other means heretofore used for the same purpose.

I claim as my invention:

1. A valve head for a faucet, comprising a metal body having a recess and a washer of yielding material pressed into said recess, said valve head being formed to provide a projection extending into said recess and having an outwardly facing inclined face which permits the insertion of said washer solely through pressure applied to the side of said washer opposite to the bottom of said recess and said projection also being formed to provide an abrupt shoulder which faces the bottom of said recess and retains said washer in said recess through the expansion of said material around said projection.

2. A valve head for a faucet, comprising a metal body having a cylindrical recess and the rim of said cylindrical recess being formed to provide an inwardly extending annular projection spaced from the bottom of the recess, and a cylindrical washer of yielding material pressed into said recess, said annular projection being formed with an outwardly facing beveled face which permits the insertion of said washer solely through pressure applied to the outer end face of said washer and said projection being also formed to provide an abrupt shoulder which faces the bottom of said recess and retains said washer in said recess through the expansion of said material into said space between the bottom of the recess and said shoulder.

In testimony whereof I hereby affix my signature.

MICHAEL J. GRASS.